(12) United States Patent
Bacovsky et al.

(10) Patent No.: US 9,876,880 B2
(45) Date of Patent: Jan. 23, 2018

(54) CREATION OF A BINDING BASED ON A DESCRIPTION ASSOCIATED WITH A SERVER

(71) Applicant: Red Hat, Inc., Raleigh, NC (US)

(72) Inventors: Martin Bacovsky, Lysice (CZ); Tomas Strachota, Zlin (CZ); Ivan Necas, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 238 days.

(21) Appl. No.: 14/627,416

(22) Filed: Feb. 20, 2015

(65) Prior Publication Data

US 2016/0165010 A1 Jun. 9, 2016

Related U.S. Application Data

(60) Provisional application No. 62/088,113, filed on Dec. 5, 2014.

(51) Int. Cl.
*H04L 29/06* (2006.01)
*H04L 29/08* (2006.01)
*G06F 9/44* (2006.01)
*G06F 9/455* (2006.01)

(52) U.S. Cl.
CPC ............ *H04L 67/42* (2013.01); *G06F 8/30* (2013.01); *G06F 8/36* (2013.01); *G06F 9/45558* (2013.01); *H04L 67/10* (2013.01); *G06F 2009/45562* (2013.01)

(58) Field of Classification Search
CPC ............ G06F 8/30; H04L 67/10; H04L 67/42
See application file for complete search history.

(56) References Cited

U.S. PATENT DOCUMENTS

| 6,253,257 | B1 | 6/2001 | Dundon |
| 6,678,887 | B1 * | 1/2004 | Hallman ............. G06F 8/70 717/162 |
| 7,478,407 | B2 | 1/2009 | Jain et al. |
| 7,490,316 | B2 | 2/2009 | Chan et al. |
| 7,516,178 | B1 * | 4/2009 | DeFrang ............. G06F 9/548 709/201 |
| 8,006,240 | B2 | 8/2011 | Bhatkhande et al. |
| 8,010,950 | B1 * | 8/2011 | Silaev ............. G06F 11/3672 717/131 |

(Continued)

OTHER PUBLICATIONS

Frank et al., "Using an Interface Proxy to Host Versioned Web Services," IBM T.J. Watson Res. Center, Yorktown Heights, NY, Published Jul. 7-11, 2008, http://ieeexplore.ieee.org/xpl/login.jsp?tp=&arnumber=4578540&url=http%3A%2F%2Fieeexplore.ieee.org%2Fxpls%2Fabs_all.jsp%3Farnumber%3D4578540.

(Continued)

*Primary Examiner* — Lashonda Jacobs
(74) *Attorney, Agent, or Firm* — Lowenstein Sandler LLP

(57) ABSTRACT

A description of an application programming interface (API) of a server system may be received at a client system. One or more methods associated with the API of the server system may be identified from the received description. The one or more methods may be associated with accessing functionality of the server system. Furthermore, a binding may be created at the client system in view of the identified one or more methods that are associated with the received description of the API server system.

20 Claims, 7 Drawing Sheets

(56) References Cited

U.S. PATENT DOCUMENTS

| | | | | |
|---|---|---|---|---|
| 8,255,932 | B1* | 8/2012 | Clemm | G06F 8/54 709/230 |
| 8,347,265 | B1* | 1/2013 | Sirianni | G06F 9/4443 717/108 |
| 8,510,762 | B1* | 8/2013 | Gregorio | G06F 8/36 717/104 |
| 8,595,715 | B2 | 11/2013 | Ward et al. | |
| 8,893,077 | B1* | 11/2014 | Aiuto | G06F 8/36 717/104 |
| 9,010,796 | B2* | 4/2015 | Eckhart | B60D 1/02 280/490.1 |
| 2001/0052111 | A1 | 12/2001 | Scott | |
| 2005/0268308 | A1* | 12/2005 | Tang | G06F 9/445 719/328 |
| 2010/0095193 | A1* | 4/2010 | Moltchanov | H04L 1/0061 714/807 |
| 2012/0297288 | A1* | 11/2012 | Mansouri | G06F 17/30893 715/234 |
| 2014/0366011 | A1* | 12/2014 | Rector | G06F 8/71 717/170 |
| 2015/0169386 | A1* | 6/2015 | Gopalraj | G06F 9/541 719/328 |
| 2016/0164953 | A1* | 6/2016 | Hristov | H04L 67/10 709/203 |

OTHER PUBLICATIONS

Unknown, "Best Practices for API Versioning? [Closed]," printed Feb. 20, 2015, http://stackoverflow.com/questions/389169/best-practices-for-api-versioning.

Stets et al., "Component-based Operating System APIs: A Versioning and Distributed Resource Solution," Microsoft Research Microsoft Corporation One Microsoft Way Redmond, WA 98052; Department of Computer Science University of Rochester Rochester, NY 14627, Published Jul. 1999, http://research.microsoft.com/pubs/69712/tr-99-24.doc.

* cited by examiner

CREATION OF A BINDING BASED ON A DESCRIPTION ASSOCIATED WITH A SERVER

RELATED APPLICATION

This patent application claims the benefit under 35 U.S.C. § 119(e) of U.S. Provisional Application No. 62/088,113 filed on Dec. 5, 2014, which is herein incorporated by reference.

TECHNICAL FIELD

Aspects of the disclosure generally relate to bindings and, more specifically, relate to the creation of a binding based on a description associated with a server.

BACKGROUND

An application programming interface (API) may be used to exchange data between a first computer system and a second computer system. The API of the first computer system may identify methods and parameters of the methods that may be used to access a resource of functionality of the first computer system. For example, the second computer system may exchange data with the first computer system by transmitting a request based on a method and a parameter of the method specified from the API of the first computer system.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
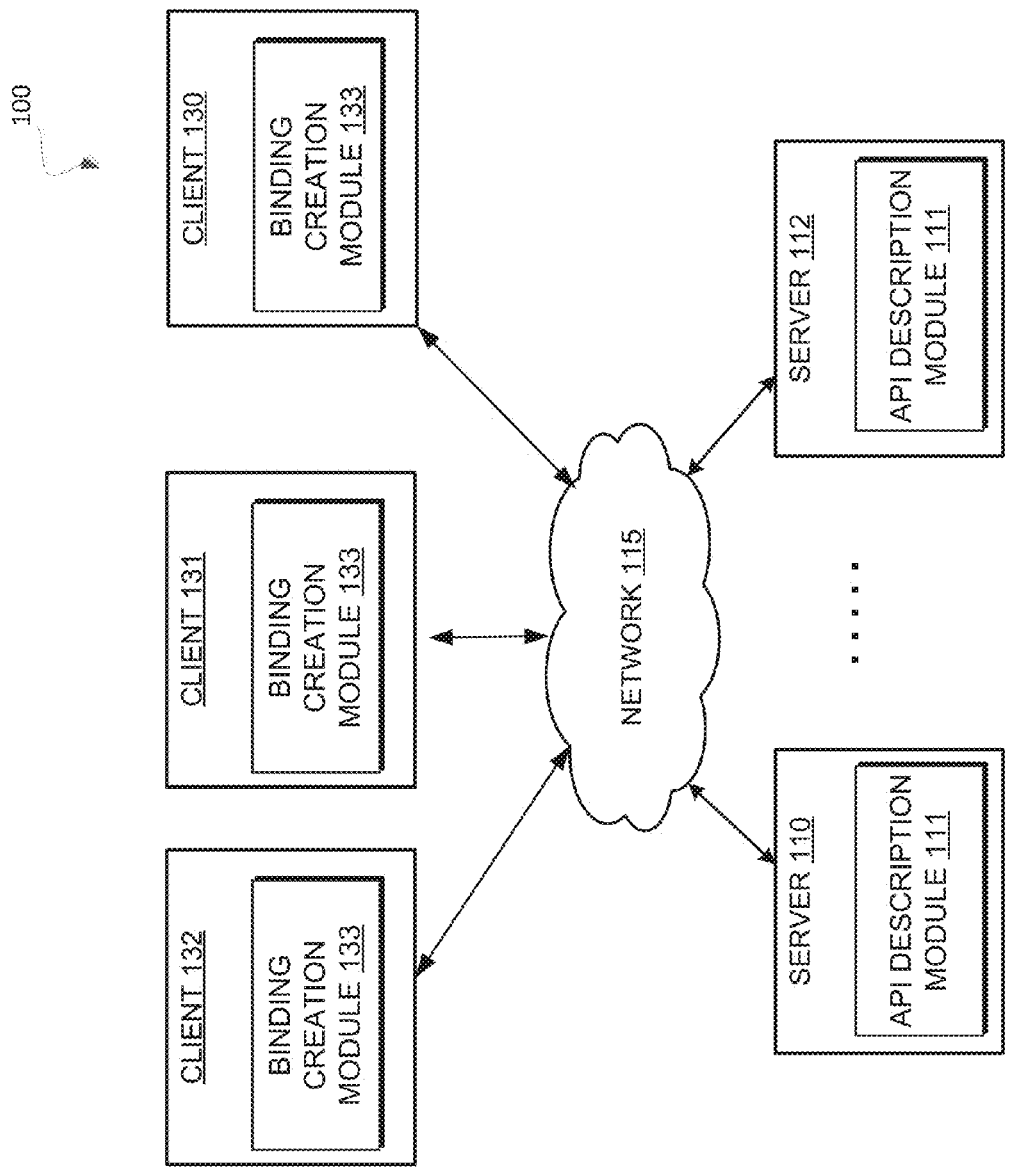
FIG. 1 illustrates an example system architecture in which embodiments of the disclosure may operate.

Embodiments of the disclosure relate to the creation of a binding based on a description associated with a server. A binding may refer to a mapping of functionality of a programming language to the functionality of another programming language. For example, a binding may be used to map or translate functions and variables that are used in an application programming interface (API) associated with a programming language to functions and variables that are used in an API associated with another programming language. The binding may be considered to be a glue code that allows a first software application that is based on a first programming language to access functionality (e.g., a library, service, etc.) of a second software application that is based on a second programming language. As such, the binding may translate or map functionality of one programming language to functionality of another programming language.

A server system may provide certain functionality to be accessed by a client system. For example, the functionality may be associated with accessing resources or capabilities managed by the server system. The server system may provide an application programming interface (API) to enable the exchanging of data between the server system and the client system as well as to allow the client system to access certain resources or functionality of the server system. For example, the API associated with the server system may specify particular methods (e.g., to provide a particular function) and available parameters (e.g., values for the function) that are associated with each of the available methods provided by the server system. A method (also referred to as a subroutine) may refer to a sequence of program instructions that perform a particular task. As such, a method for the server system may specify a program instruction based on a programming language used by the server system.

The client system may transmit data to the server system that identifies a method and provides one or more values for one or more of the parameters as defined by the API of the server system. In response, the API of the server system may receive the identification of the method and the one or more values for one or more parameters and may transmit data to the client system or allow access to a resource or functionality of the client system to the server system (e.g., perform a program instruction based on values of the parameters). For example, a method "user list" may be used to return a user list and available parameters of the method "user list" may be time, location, and type. The client system may identify the "user list" method and provide a value of "location=Czech Republic" for the location parameter and transmit the identification of the "user list" method and the "location=Czech Republic" value for the location parameter to the server system. The server system may then perform a function (e.g., through the program instruction of the method) that corresponds to the "user list" method based on the value of the location parameter. The server system may then return data to the client system (e.g., a user list of users who are associated with the location of the Czech Republic).

If the server system is updated (e.g., a software application providing the API, the operating system of the server system is updated, a software plug-in is installed, or any other such software change), then the API of the server system may be changed. The updating of the server system may involve the updating of an application server, and the API provided by the application server may provide access to functionality or resources provided by the application server (e.g., entities in a database, associated application server services, etc.). The updating of the application server may require a changing of an API provided by the application server. For example, methods and/or parameters may be added or removed or method names or parameter names may be changed. Such changes to the API of the server system may be frequent if the software of the server system is frequently updated or if software plug-ins are frequently installed to add available functionality that would be provided through a method in the API of the server system. If a client system is to access the functionality of the server system through the API of the server system, a binding may need to be provided to the client system to access the new functionality provided by the server system through the updated API. The binding at the client system may match the API of the server system. For example, the binding may translate or map commands or methods of the client system (e.g., in a first programming language) to methods of the API of the server system (e.g., in a second programming language). As such, each time that the API of the server system is updated, a new binding may be required to be provided to the client system. However, such installing of the binding on the client system each time that the API of the server system is updated may require significant maintenance and dependency management overhead by an administrator of a network that is associated with multiple client systems. For example, whenever an API of a server system is updated, then the binding for each of the client systems in a network may also need to be updated.

Instead of providing a new binding to multiple client systems when an API of a server system is updated, a binding may be created at a client system when a client system connects to a server system. For example, when a client system connects to a server system, the server system may transmit to the client system a description of the API that is used by the server system. The description may include a list of available resources provided by the server system, methods and parameters used by the API of the server system, and any other API related information. In some embodiments, the API description may be smaller in size than the API used by the server system or a binding. For example, the API description may list methods and parameters for the methods. The client system may then dynamically build a binding based on the received description of the API used by the server system.

The creation of the binding may involve the mapping or translating of the programming language used by the software of the client system with the API of the server system. The mapping or translating may include mapping or translating methods and parameters of software based on the programming language of the client system with corresponding methods and parameters of the API of the server system that is based on another programming language. As an example, the binding may translate or map methods and parameters of a software based on a Ruby programming language used by the client system to a Hypertext Transfer Protocol (HTTP) used by the server system and its API. The creation of the binding may include the identification and creation of programming method calls and corresponding parameters used by the client system to interact with the methods and parameters of the API of the server system.

As such, a server system may create a description of its API when the API changes in response to a software update or an installation of a software plug-in. The description of the API of the server system may be transmitted to a client system when a client system connects with the server system to access functionality or resources of the server system. In response to receiving the API of the server system, the client system may create a binding based on the received API of the server system. The binding may translate or map methods and parameters of the client system that is based on a programming language to methods and parameters of the API of the server system that is based on another programming language.

The client system may store the API description of the server system in a cache memory (e.g., in a disk cache). For example, the client system may receive the API description at a first time and store the API description in a memory. Furthermore, the client may calculate or determine a checksum or hash value of the API description. The client system may connect to the server system at a second time. The server system may transmit a checksum or a hash value of its current API description to the client system in response to the client system connecting to the server system. The client system may compare the received checksum or hash value with a checksum or hash value of the API description stored in the memory of the client system. If the checksum or hash value from the server system matches the checksum or hash value stored at the client system, then the client system may not request the API description from the server system as the current binding used by the client system matches the current API used by the server system. However, if the checksum or hash value from the server system does not match the checksum or hash value stored at the client system, then the client system may request a new API description from the server system. Furthermore, the API description currently stored at the client system may be removed or deleted. In some embodiments, the binding associated with the API description may also be deleted. Furthermore, a new binding may be created based on the new API description received from the server system.

Furthermore, the received API description from the server system may adjust a configuration of the client system. For example, the client system may be associated with a virtual machine (VM) that is provisioned on the client system. The VM may be provisioned based on the received API description from the server system. For example, the VM may be configured to provide functionality if the API description from the server system indicates that the server system provides such functionality. Furthermore, the VM may be configured to not allow some functionality to a user if the API description from the server system indicates that the server system does not provide such functionality. For example, if the API description from a server system does not include a method that allows a network device of the server system to be accessed, then the VM may not be provisioned with a configuration setting that allows the network device to be accessed. However, if the API description from the server system includes a method that allows a user list or other data to be generated, then the VM may be provisioned with a configuration setting that allows a command to be issued for generating the user list or other such data.

FIG. 1 illustrates an example system architecture 100. In general, the system architecture 100 may include servers 110 and 112 coupled to client systems 130, 131, and 132 over a network 115. Each of the client systems 130, 131, and 132 may connect to the servers 110 and 112 via the network 115. The client systems 130, 131, and 132 and servers 110 and 112 may be a computing device such as a desktop computer or a laptop computer, or a portable computing device such as, but not limited to, mobile telephones, personal digital assistants (PDAs), portable media players, netbooks, tablet computers, portable gaming consoles, portable televisions, electronic book readers, and the like. The network 115 may be a private network (e.g., a local area network (LAN), a wide area network (WAN), intranet, etc.), a public network, a wireless network, a cellular network, or a combination thereof.

The servers 110 and 112 may be server computers that are part of an online infrastructure system. Examples of an online infrastructure include a cloud computing platform that may allow multiple users from multiple client systems to access different components or resources of the cloud computing platform. The online infrastructure may provide physical or virtual resources, such as access to services, servers, or other such resources, to client systems that have created a binding to exchange data with the servers 110. Examples of services provided by the online infrastructure may include, but are not limited to, access to data stored on storage devices, provisioning of virtual machines, software services, physical servers, etc.

The servers 110 and 112 may each include an API description module 111 that may be used to create an API description currently being used the corresponding server 110. For example, the API description module 111 of one of the servers 110 and 112 may create a first API description to identify a first API being used by the server 110 and another API description module 111 of one of the servers 112 may create a second API description to identify a second API that is being used by the other server 112.

Each of the client systems 130, 131, and 132 may include a binding creation module 133 to create a binding based on an API description that has been created at one of the servers 110 or 112. For example, the client system 130 may provision a first virtual machine to connect to the server 110. In response to the connection, the client system 130 may receive an API description created by the API description module 111 of the server 110. The binding creator module 133 of the client system 130 may then create a binding based on the received API description. After creating the binding, the virtual machine provisioned by the client system 130 may exchange data with the server 110 based on the binding created by the binding creator module 133.

As such, an online infrastructure may provide multiple resources of servers that may be accessed by multiple client systems. In response to a client system connection to a server system, a description of the API currently being used by the server system may be transmitted to the client system. The client system may then generate a binding based on the received API description. Furthermore, the client system may exchange data with the server system based on the created binding.

Figure 2:
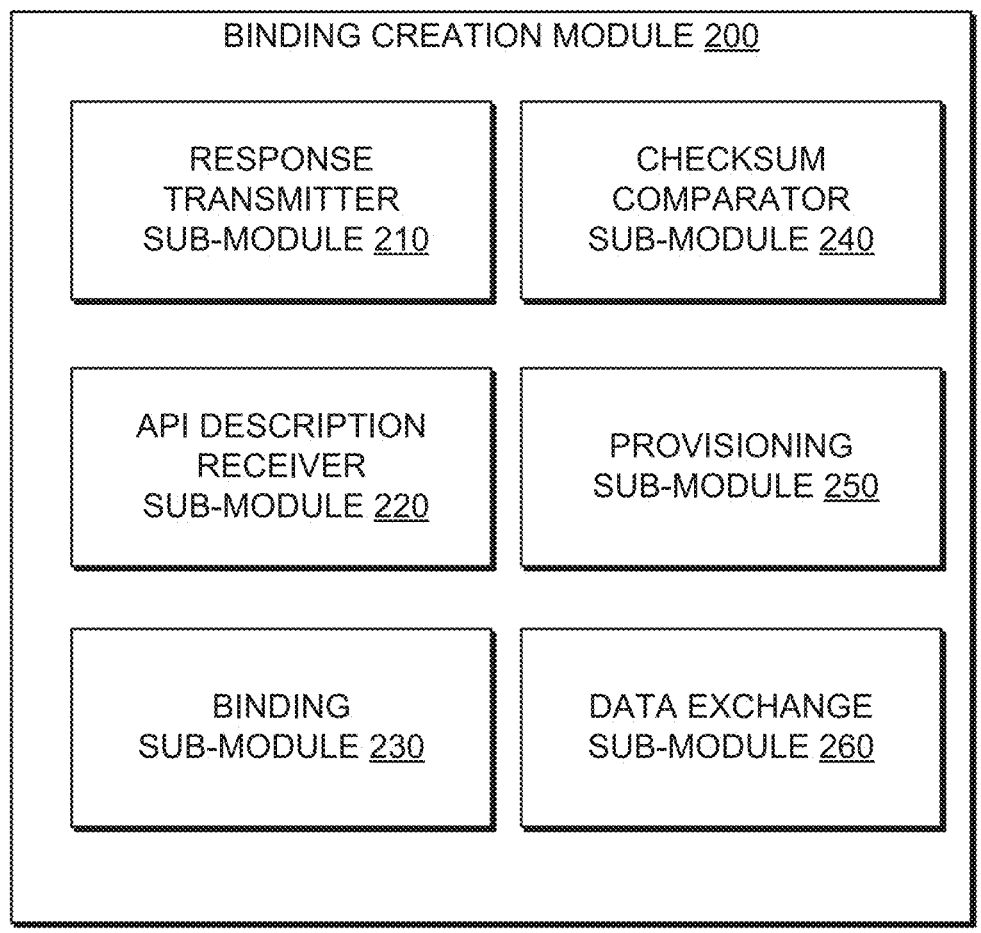
FIG. 2 illustrates an example binding creation module in accordance with some embodiments of the disclosure.

FIG. 2 illustrates an example binding creation module 200 in accordance with some embodiments of the disclosure. In general, the binding creation module 200 may correspond to binding creation modules 133 located at each of the client systems 130, 131, and 132 of FIG. 1. The binding creation module 200 may include a response transmitter sub-module 210, an API description receiver sub-module 220, a binding sub-module 230, a checksum comparator sub-module 240, a provisioning sub-module 250, and a data exchange sub-module 260. In alternative embodiments, the functionality of one or more of the sub-modules may be combined or divided.

As shown in FIG. 2, the binding creation module 200 may include a response transmitter sub-module 210 that transmits a request to connect to a server system. For example, the response transmitter sub-module 210 may transmit a request from a client system that is attempting to connect to a server system and/or to access functionality of the server system. The API description receiver sub-module 220 may receive an API description from the server system to which the client system has transmitted the request to connect. For example, when the client system attempts to establish a connection with the server system, the client system may receive an API description associated with a current API used by the server system. Furthermore, the binding sub-module 230 may create a binding based on the API description that has been received from the server system. For example, the binding based on the API description of the server system may be created at the client system after the API description has been transmitted from the server system to the client system. Additional details regarding the creation of a binding are disclosed in conjunction with regard to FIGS. 3A and 4 and additional details regarding the creation of the API description at the server system are disclosed in conjunction with FIG. 3B.

Referring to FIG. 2, the binding creator module 200 may include a checksum comparator sub-module 240 that may compare a checksum of an API description previously received by a client system and for which the binding of the client system is currently based on with a checksum of an API description currently being used by a server system. The checksum comparator sub-module 240 may create a new binding at the client system based on the comparison of the checksum values. Additional details with regard to the creation of a new binding at the client system based on the comparison of the checksum values is disclosed with regard to FIG. 4.

The binding creator module 200 may include a provisioning sub-module 250 that may transmit a request to provision a virtual machine on a server system based on a received API description of the server system. Additional details regarding the provisioning of a virtual machine based on an API description are disclosed in conjunction with FIG. 5. Furthermore, the data exchange sub-module 260 may exchange data with a server system based on the binding created by the binding sub-module 230. For example, the binding may translate or map methods and parameter values of a first programming language used by the client system to methods and parameter values of a second programming language used by the server system.

Figure 3A:
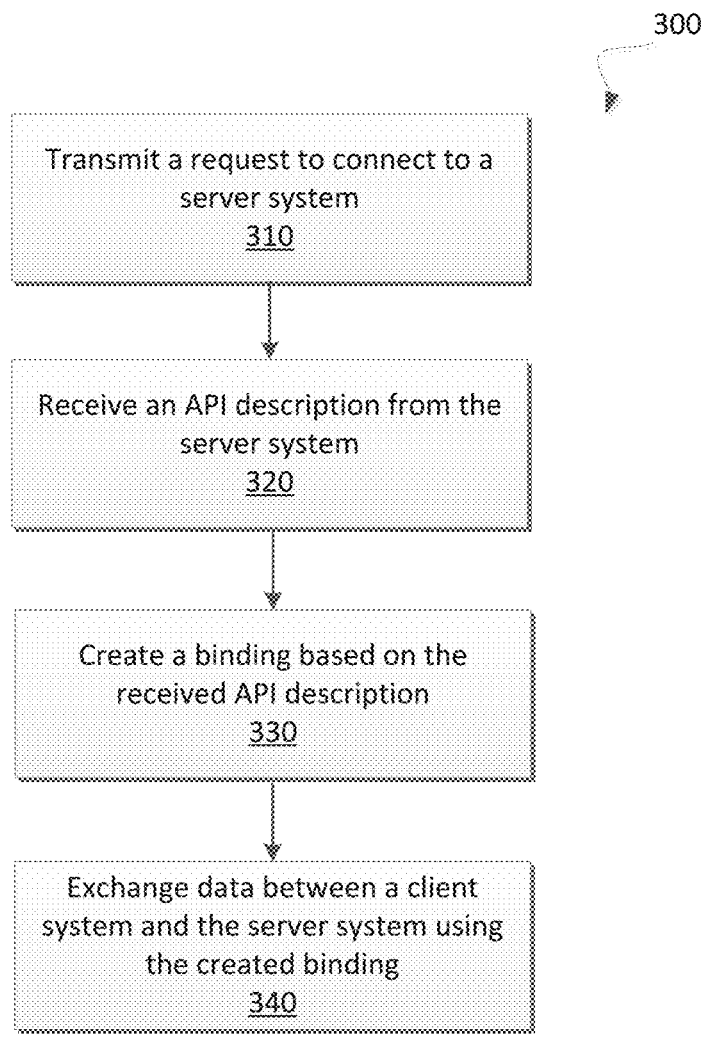
FIG. 3A is a flow diagram of an example method to create a binding at a client system based on an API description of a server system in accordance with some embodiments.

FIG. 3A is a flow diagram of an example method 300 to create a binding at a client system based on an API description of a server system. The method 300 may be performed by processing logic that may comprise hardware (e.g., processing device, circuitry, dedicated logic, programmable logic, microcode, etc.), software (e.g., instructions run or executed on a processing device), or a combination thereof. In general, the method 300 may be performed by a binding creation module 133 or 200 of a client system.

As shown in FIG. 3A, the method 300 may begin with the processing logic transmitting a request to connect to a server system (block 310). For example, a client system may connect to a server system over a network to access at least some functionality of the server system. In response to the client system connecting to the server system, the processing logic may receive an API description from the server system (block 320). The API description may list methods used in an API currently used by the server system as well as available parameters for each of the methods. The processing logic may create a binding based on the received API description (block 330). For example, each method identified from the list of methods in the API description may be mapped or translated or created as a function call based on the available parameters for the method. In some embodiments, a library of translations of methods to function calls may be stored (e.g., at a client system) so that when an identified method is received from the API description, the appropriate library may be used to create the translation or mapping to the function call. The processing logic may subsequently exchange data between the client system and the server system using the created binding that is based on the received API description (block 340). For example, when the client system attempts to access a functionality of the server system, the client system may use the binding to translate or map a function or method call from a programming language used by software of the client system to an applicable function or method call from another programming language used by other software of the server system.

Figure 3B:
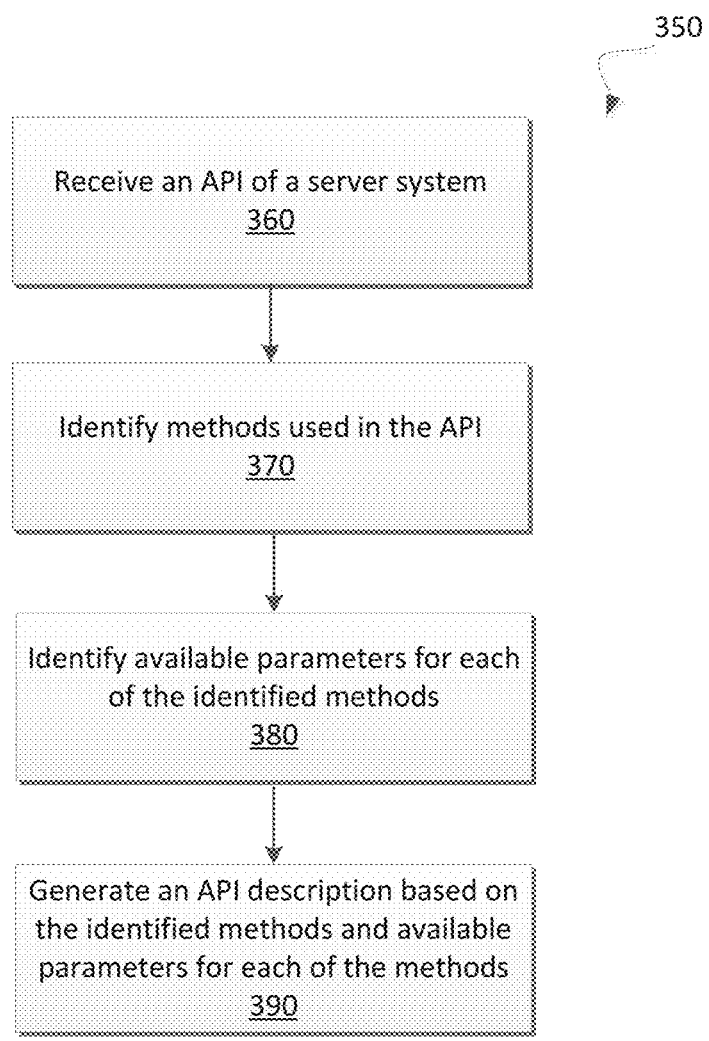
FIG. 3B is a flow diagram of an example method to create an API description that is used to create a binding in accordance with some embodiments of the disclosure.

FIG. 3B is a flow diagram of an example method 350 to create an API description that is used to create a binding. The method 350 may be performed by processing logic that may comprise hardware (e.g., processing device, circuitry, dedicated logic, programmable logic, microcode, etc.), software (e.g., instructions run or executed on a processing device), or a combination thereof. In general, the method 350 may be performed by an API description module 111 of a server system.

As shown in FIG. 3B, the method 350 may begin by the processing logic receiving an API of a server system (block 360). For example, the API that is currently being used by a server system may be received. The processing logic may subsequently identify methods used in the API that is currently being used by the server system (block 370). For example, programming method calls or subroutines used in the API may be identified. Furthermore, the processing logic may identify available parameters for each of the identified methods (block 380). Additionally, the processing logic may generate an API description based on the identified methods and available parameters for each of the methods (block 390). The API description may subsequently be transmitted to a client system in response to a connection of the client system to the server system.

Figure 4:
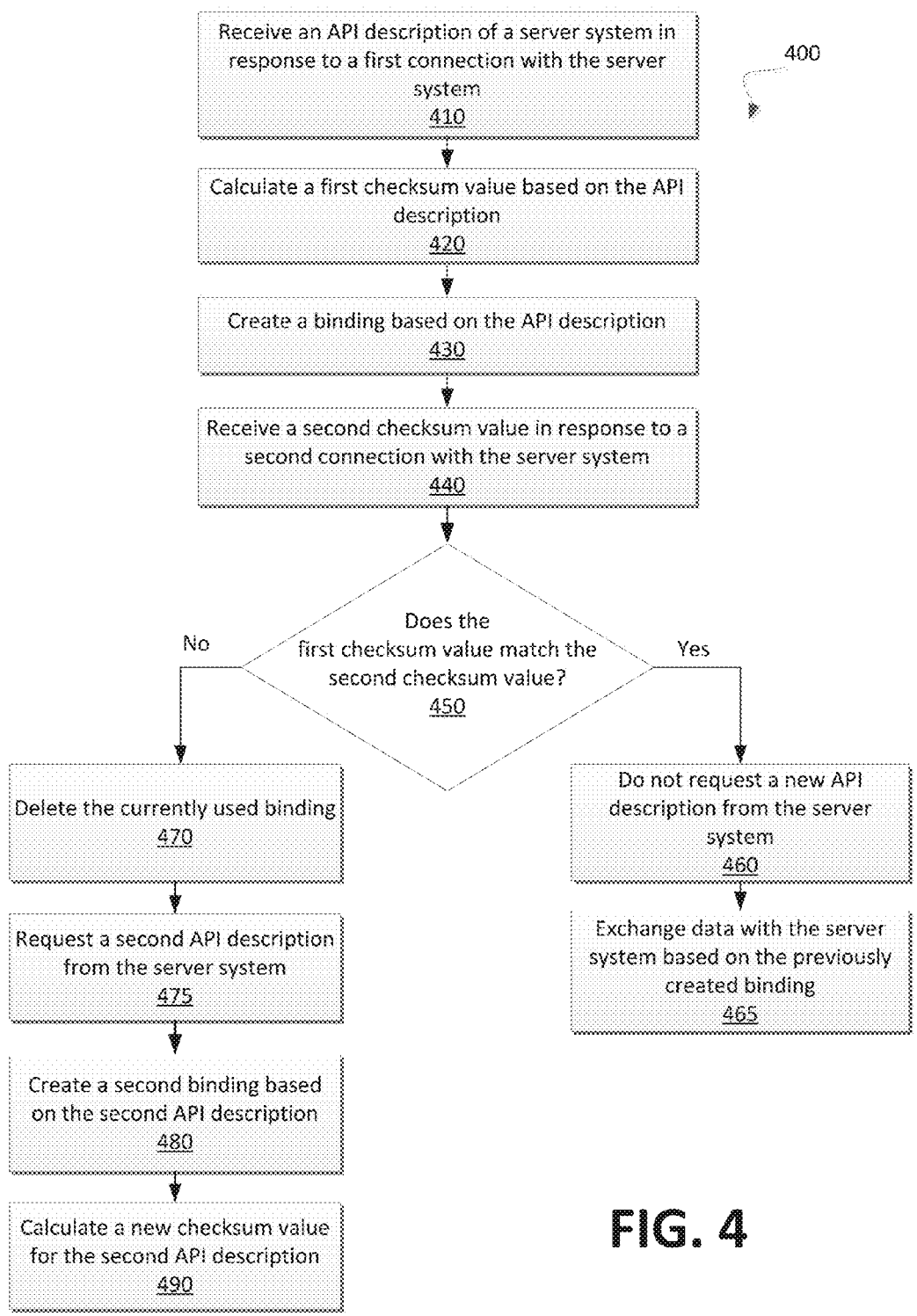
FIG. 4 is a flow diagram of an example method to create a binding based on a checksum value in accordance with some embodiments.

FIG. 4 is a flow diagram of an example method 400 to create a binding based on a checksum value. The method 400 may be performed by processing logic that may comprise hardware (e.g., processing device, circuitry, dedicated logic, programmable logic, microcode, etc.), software (e.g., instructions run or executed on a processing device), or a combination thereof. In general, the method 400 may be performed by binding creation module 133 or 200 of a client system.

As shown in FIG. 4, the method 400 may begin with the processing logic receiving an API description of a server system in response to a first connection with the server system (block 410). For example, the API description may be associated with an API currently being used by the server system. The processing logic may furthermore calculate a first checksum value based on the received API description (block 420). In some embodiments, the first checksum value may correspond to a hash value that is generated by a hash algorithm. Furthermore, the hash algorithm may be a function that is used to map data of arbitrary size (e.g., the API description) to data of a fixed size (e.g., the checksum value or a hash number), with slight differences in input data producing differences in the output of the hash algorithm. The values returned by the hash algorithm may be referred to as hash values, hash codes, hash sums, hashes, checksum values, or hash numbers. The checksum value may be calculated based on the methods and parameters for each of the methods that are identified from the API description. For example, a first API description with a first method and a second method may result in the calculation of a first checksum value and a second API description with the first method and a third method may result in the calculation of a different checksum value. As such, an API description with at least one different method and/or at least one method with at least one different parameter may result in a different checksum value.

Referring to FIG. 4, the processing logic may create a binding based on the received API description (block 430). For example, a binding may be created from the API description for which the checksum value has been calculated. Furthermore, the processing logic may receive a second checksum value in response to a second connection from the client system to the server system (block 440). The second checksum value may be calculated by the server system based on the same hash algorithm that the client system has used to calculate the first checksum value. In some embodiments, the second checksum value may be calculated from an API description of an API currently being used by the server system. The processing logic may determine if the first checksum value calculated by the client system matches the second checksum value calculated by the server system and received by the client system (block 450). If the first checksum value matches the second checksum value, then the processing logic may not request a new API description from the server system (block 460). Furthermore, the processing logic may exchange data with the server system based on the binding that was previously created by the client system (block 465). However, if the processing logic determines that the first checksum value calculated by the client system does not match the second checksum value calculated by and received from the server system, then the binding currently used by the client system may be deleted or disabled (block 470). For example, the binding may no longer be used by the client system. The processing logic may subsequently request a second API description from the server system (block 475). For example, a new API description that corresponds to the API currently being used by the server system may be requested. The server system may then transmit the second API description to the client system. Furthermore, the processing logic may create a second binding based on the second API description (block 480). For example, a second binding may be created to replace the first binding that is no longer used by the client system. The second binding may then be used to exchange data and/or commands with the server system. Furthermore, the processing logic may calculate a new checksum value for the second API description (block 490). For example, the same hash algorithm used to calculate the first checksum value and the second checksum value may be used to calculate a third checksum value corresponding to the second API description. The third checksum value may then be compared with a subsequent checksum value received from the server system in response to a subsequent connection with the client system.

Figure 5:
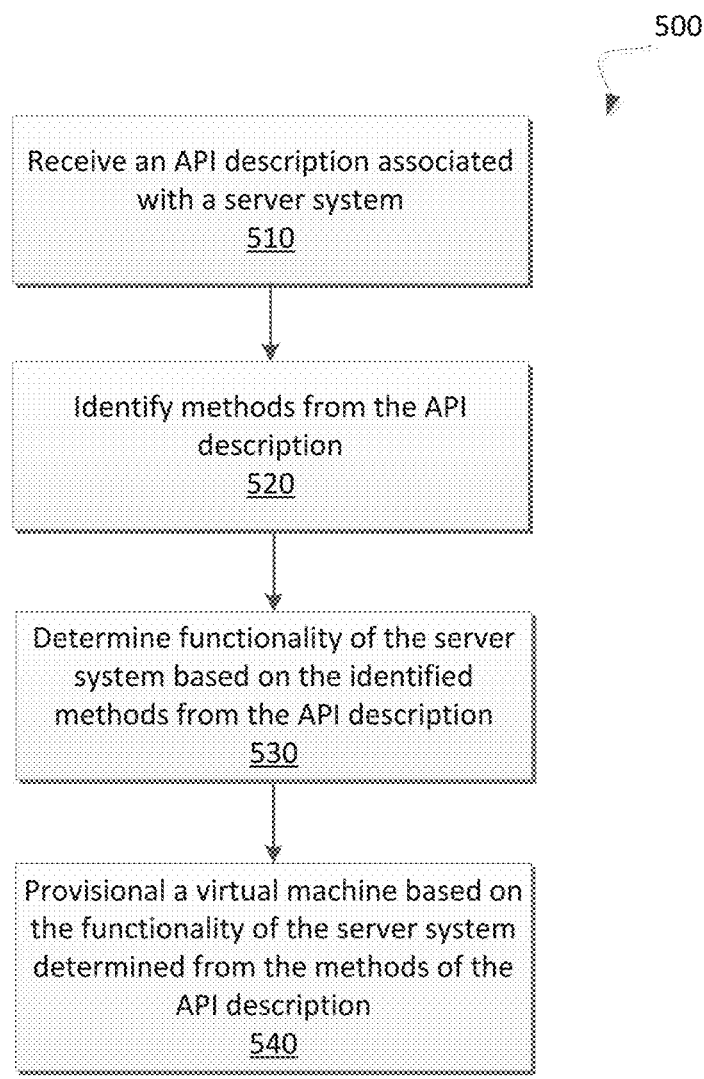
FIG. 5 is a flow diagram of an example method to provision a virtual machine or to configure a client system based on a received API description in accordance with some embodiments.

FIG. 5 is a flow diagram of an example method 500 to provision a virtual machine or to configure a client system based on a received API description. The method 500 may be performed by processing logic that may comprise hardware (e.g., processing device, circuitry, dedicated logic, programmable logic, microcode, etc.), software (e.g., instructions run or executed on a processing device), or a combination thereof. In general, the method 500 may be performed by binding creation module 133 or 200 of a client system.

As shown in FIG. 5, the method 500 may begin with the processing logic receiving an API description associated with a server system (block 510). For example, a client system may connect to the server system and may receive the API description of an API that is currently being used by the server system. The processing logic may further identify methods from the API description (block 520). Furthermore, the processing logic may determine functionality of the server system based on the identified methods from the API description (block 540). For example, the processing logic may determine that particular methods identified from API description relate to accessing a storage device of the server system, a networking device of the storage system, a particular command or operation that the server system is to perform in response to receiving such a command or operation, etc. As such, capabilities, functionality, and resources provided by the server system to a client system via an API may be identified from the API description that is received by the client system from the server system. In some embodiments, if the methods identified from the API description indicate that the server system allows access to a first resource (e.g., a storage device) and will respond to a first operation (e.g., an operation for the server system to provide information to the client system), then the virtual machine and/or client system may be configured based on the first resource and the first operation. However, if the API description does not include a method that allows access to a second resource (e.g., a network device associated with the server system), then the virtual machine of the client system may not be configured to include functionality to access the second resource of the server system. For example, software relating to the second resource of the server system may not be installed or provisioned as part of the virtual machine that is to access the server system.

Figure 6:
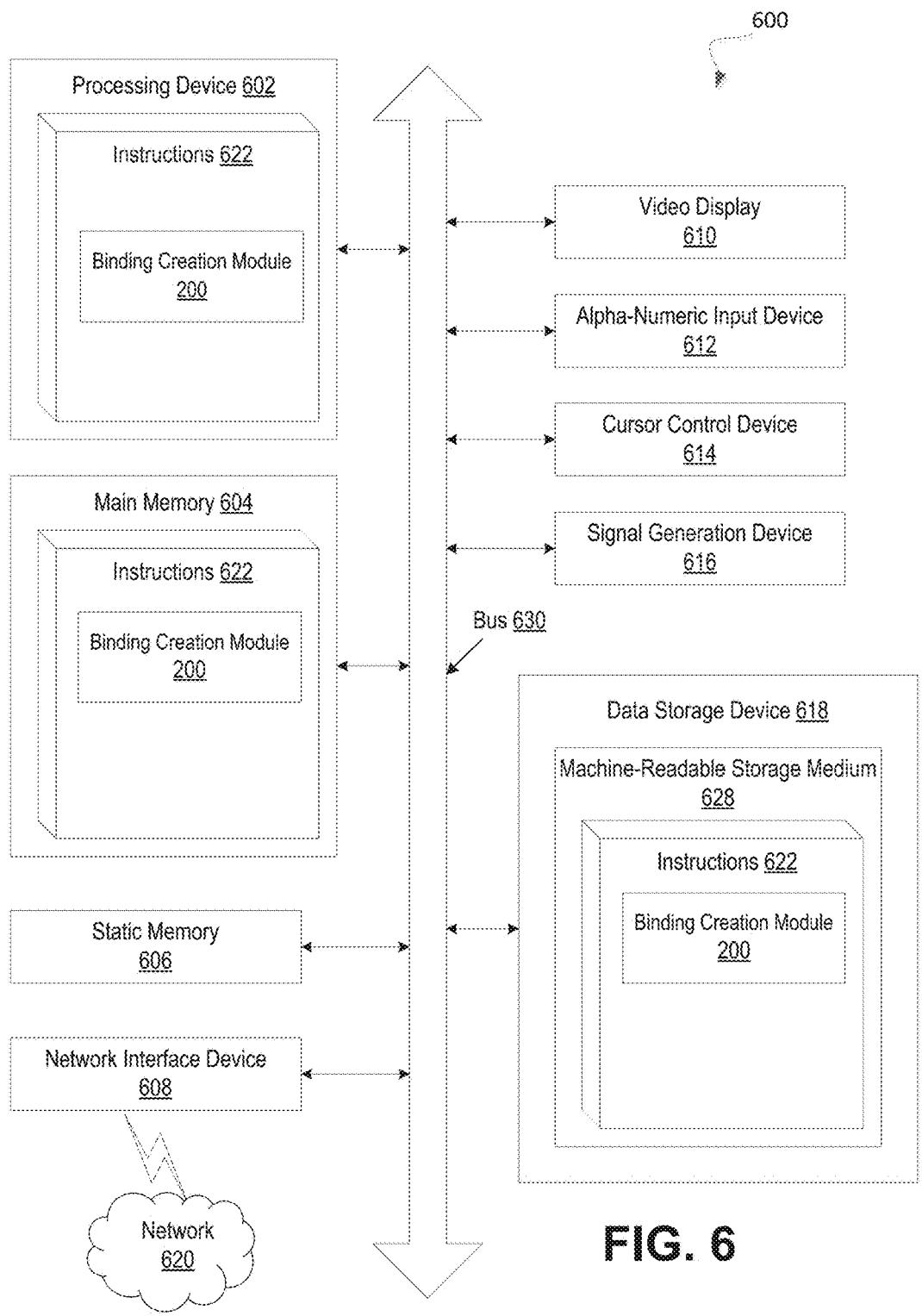
FIG. 6 illustrates a block diagram of a computer system in which some embodiments of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a binding creation module (e.g., binding creation module 133 of FIG. 1 and/or binding creation module 200 of FIG. 2) and/or an API description module 111 of FIG. 1, and/or a software library containing methods that call modules or sub-modules in a binding creation module and/or an API description module. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   receiving an indication that an application programming interface (API) of a server system has been updated;
   in response to receiving the indication that the API of the server system has been updated, receiving, at a client system, a description of the API of the server system;
   identifying one or more methods associated with the API of the server system from the received description, wherein the one or more methods are associated with accessing functionality of the server system; and
   creating, by a processing device of the client system, a binding at the client system in view of the indication that the API of the server system has been updated and the identified one or more methods associated with the received description of the API of the server system to map the one or more methods of the API of the server system to another API of the client system.

2. The method of claim 1, further comprising:
   identifying one or more parameters for each of the identified one or more methods associated with the API of the server system from the received description,
   wherein the creating of the binding at the client system is further in view of the identified one or more parameters.

3. The method of claim 1, wherein the client system is associated with a first programming language and the server system is associated with a second programming language, and wherein the creating of the binding at the client system comprises:
   translating a method of the first programming language associated with the client system to at least one of the one or more methods associated with the API of the server system in view of the second programming language.

4. The method of claim 1, wherein the description of the API of the server system is received in response to a first connection between the client system and the server system, the method further comprising:
   calculating a checksum value associated with the received API description of the server system;
   establishing a second connection between the client system and the server; and
   receiving a second checksum value in response to establishing the second connection between the client system and the server.

5. The method of claim 4, the method further comprising:
   comparing the checksum value with the second checksum value; and
   in response to determining that the checksum value not matching the second checksum value, requesting a new API description from the server system,
   wherein the creating of the binding at the client system is in view of the new API description in response to determining that the checksum value does not match the second checksum value.

6. The method of claim 1, wherein the API of the server system is associated with a first protocol and the client system is associated with a second protocol, and wherein the binding is used by the client system to translate a command from the second protocol used by the client system to the first protocol used by the API of the server system.

7. The method of claim 1, further comprising:
   provisioning a virtual machine at the server system in view of the API description of the server system.

8. A system comprising:
   a memory; and
   a processing device, operatively coupled with the memory, to:
   receive an indication that an application programming interface (API) used by a server system has been updated;
   in response to receiving the indication that the API of the server system has been updated, receive the updated API used by the server system;
   identify a method from the API used by the server system, wherein the method is associated with accessing an operation of the server system;
   create a description of the API used by the server system in view of the identified method; and
   transmit the description of the API to a client system in view of the indication that the API of the server system has been updated and in response to a connection between the client system and the server system to map the method from the API used by the server system to another API used by the client system.

9. The system of claim 8, wherein the processing device is further to:
identify one or more available parameters used in the identified method from the API used by the server system from the received description,
wherein the processing device is further to create the description of the API in view of the identified one or more available parameters.

10. The system of claim 8, wherein the client system is associated with a first programming language and the server system is associated with a second programming language.

11. The system of claim 8, wherein the processing device is further to:
calculate a first hash number of the API description, wherein the first hash number is provided to the client system before transmitting the description of the API;
receive an update to change a configuration of the server system, wherein the changing of the configuration changes the API used by the server system; and
calculate a second hash number for an updated API description corresponding to the updated API used by the server system.

12. The system of claim 11, wherein the processing device is further to:
transmit the second hash number to the client system in response to a subsequent connection between the client system and the server system; and
transmit the updated API description to the client system in response to a request from the client system in view of a comparison by the client system of the second hash number in view of another hash number.

13. The system of claim 8, wherein the server system is associated with provisioning a virtual machine on the server system for the client system to access the operation of the server system.

14. The system of claim 13, wherein the virtual machine is provisioned in view of the API description of the server system.

15. A non-transitory machine-readable storage medium including data that, when accessed by a processing device, cause the processing device to:
receive an indication that an application programming interface (API) of a server system has been updated;
in response to receiving the indication that the API of the server system has been updated, receive, at a client system, a description of the API of the server system;
identify one or more methods associated with the API of the server system from the received description, wherein the one or more methods are associated with accessing functionality of the server system; and
create, by the processing device, a binding at the client system in view of the indication that the API of the server system has been updated and the identified one or more methods associated with the received description of the API of the server system to map the one or more methods of the API of the server system to another API of the client system.

16. The non-transitory machine readable storage medium of claim 15, wherein the processing device is further to:
identify one or more parameters for each of the identified one or more methods associated with the API of the server system from the received description, wherein the creating of the binding at the client system is further in view of the identified one or more parameters.

17. The non-transitory machine readable storage medium of claim 15, wherein the client system is associated with a first programming language and the server system is associated with a second programming language, and wherein to create the binding at the client system, the processing device is further to:
translate a method of the first programming language associated with the client system to at least one of the one or more methods associated with the API of the server system in view of the second programming language.

18. The non-transitory machine readable storage medium of claim 15, wherein the description of the API of the server system is received in response to a first connection between the client system and the server system, the processing device is further to:
calculate a checksum value associated with the received API description of the server system;
establish a second connection between the client system and the server; and
receive a second checksum value in response to establishing the second connection between the client system and the server.

19. The non-transitory machine readable storage medium of claim 18, wherein the processing device is further to:
compare the checksum value with the second checksum value; and
in response to determining that the checksum value not matching the second checksum value, request a new API description from the server system, wherein the creating of the binding at the client system is in view of the new API description in response to determining that the checksum value does not match the second checksum value.

20. The non-transitory machine readable storage medium of claim 15, wherein the API of the server system is associated with a first protocol and the client system is associated with a second protocol, and wherein the binding is used by the client system to translate a command from the second protocol used by the client system to the first protocol used by the API of the server system.

* * * * *